Nov. 20, 1956   P. J. C. KAASENBROOD   2,771,486
PREPARATION OF AROMATIC POTASSIUM SULPHONATES
Filed Dec. 7, 1953
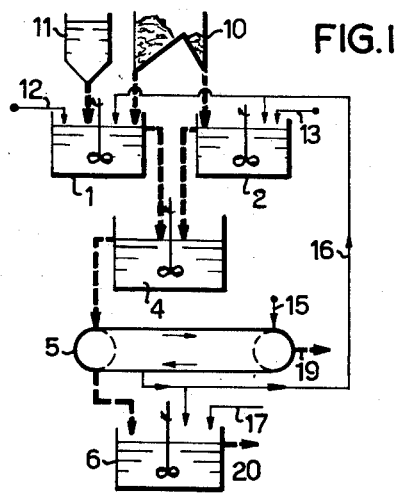
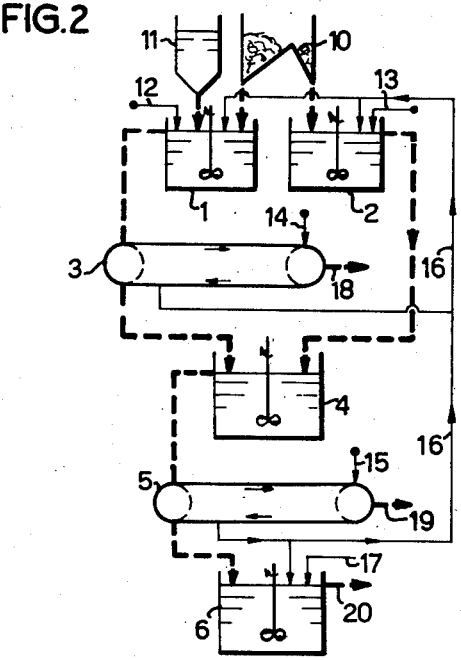
INVENTOR:
Petrus J. C. Kaasenbrood,
BY Cushman, Darby and Cushman
ATTORNEYS.

United States Patent Office 2,771,486
Patented Nov. 20, 1956

2,771,486
PREPARATION OF AROMATIC POTASSIUM SULPHONATES

Petrus J. C. Kaasenbrood, Geleen, Netherlands, assignor to Stamicarbon N. V., Heerlen, Netherlands Application December 7, 1953, Serial No. 396,549

Claims priority, application Netherlands December 11, 1952

8 Claims. (Cl. 260—505)

This invention relates to a process for the preparation of aromatic potassium sulphonates by converting an aromatic sulphonic acid corresponding with the desired sulphonate with the residue obtained in the preparation of a phenol from potassium sulphonate and lime.

According to the so-called Tyrer process phenols, or phenol ethers, are prepared by heating the corresponding potassium sulphonates with lime and, if desired, passing steam through, or, if a phenol ether is to be prepared, passing an alcohol vapour through the mixture. The main reaction, comprising phenol formation, is:

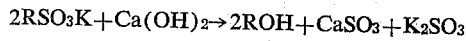

$2RSO_3K + Ca(OH)_2 \rightarrow 2ROH + CaSO_3 + K_2SO_3$ wherein "R" denotes an aromatic nucleus of any description, whether or not carrying further substituents.

The residue, therefore, consists mainly of a mixture of solid potassium sulphite and calcium sulphite and, possibly, double salts thereof; but also an excess of calcium oxide, rather large amounts of oxides, hydroxides, carbonates, sulphates, phenolates and sulphonates of potassium and/or calcium are present in said residue.

As, for reasons of economy, it is advisable to recover the potassium and, preferably, to use it again for the preparation of a new charge of sulphonate, it has been proposed to carry out the conversion of the sulphonic acid direct with said residue.

However, if to a solution of sulphonic acid an amount of residue is added, containing an amount of potassium which is equivalent to the sulphonic acid present, not only potassium but also calcium is dissolved and, consequently, potassium losses are high.

If the residue is first extracted with water and the sulphonic acid is converted with the solution thus obtained a large portion of the potassium may be utilised, it is true, but the solid substances to be separated in the extraction step are very difficult to filter.

The main object of the invention is to provide an improved process for the preparation of aromatic potassium sulphonates of the kind specified wherein potassium losses are extremely low.

A further object of the invention is to provide such a process wherein, in connection with the necessary separation of solid substances from liquids, no filtration difficulties are encountered.

A further object of the invention is to provide a process of the kind specified which is specially suited for the preparation of potassium sulphonate solutions of such a high concentration that they are easy to convert into a fresh charge of the mixture of potassium sulphonate and lime required for the said Tyrer phenol preparation process.

Further objects of the invention will appear hereinafter and in the claims hereof.

The term "phenol preparation" is used herein and in the claims hereof to denote any process of the kind specified in which a phenol is prepared from the corresponding potassium sulphonate and lime, whether or not in the presence of steam, or in the presence of an alcohol vapour, in those cases where it is intended to directly convert the phenol formed into a phenol ether.

According to the invention the conversion of the sulphonic acid is carried out in two steps, viz., by treating an aqueous solution of the sulphonic acid with part of the amount of phenol preparation residue theoretically required for the conversion of the acid into potassium sulphonate and treating the remaining part of said amount of residue with water and/or a dilute solution of potassium sulphonate, and, as the second step, mixing the sulphonate solution obtained in the first mentioned treatment, whether or not after separation of the precipitate present therein, with the suspension obtained by the treatment of the said remaining part of the residue, and subsequently separating the suspended solid material from the resulting potassium sulphonate solution.

According to the invention 75–90% of the theoretically required amount of residue is added direct to the sulphonic acid solution. Optimum results are obtained when treating the sulphonic acid solution with an amount of residue which varies with the nature of the sulphonic acid to be treated. In any case, an amount of residue is added to the sulphonic acid solution which is as great as admissible in order to avoid a too strong dilution of the ultimate potassium sulphonate solution, thus restricting the necessary further concentration of said solution before the preparation of a fresh charge of the mixture of potassium sulphonate and lime required for the Tyrer phenol preparation process.

The appropriate amount of water and/or diluted potassium sulphonate solution to be supplied in the treatment of the remaining part of the residue should be determined empirically. It has appeared that the potassium losses are especially low when the process is directed to the production of rather high concentrated potassium sulphonate solutions which is in itself desirable with respect to the further treatment of said solutions as hereinbefore mentioned.

If it is desired to carry out the process according to the invention in a continuous manner the ultimate potassium sulphonate solution, in so far as it is not yet sufficiently concentrated, may be recirculated, preferably by means of feeding it, wholly or partly, to the sulphonic acid treatment step.

Summing up, it may be said that the present invention relates to a process for the preparation of aromatic potassium sulphonates by converting an aromatic sulphonic acid corresponding with the desired sulphonate with the residue obtained in the preparation of a phenol from potassium sulphonate and lime, said process comprising treating a solution of the sulphonic acid with 70–95% of an amount of residue equivalent to the sulphonic acid as regards the amount of potassium contained, and mixing the resulting solution of sulphonate, whether or not after separation of the precipitate present therein, with a suspension obtained by treating the remainder of the above-mentioned amount of residue with water and/or a dilute potassium sulphonate solution, after which the suspended solid material present in the resulting solution of potassium sulphonate is separated.

In order that the invention will be readily understood, reference will be made to the accompanying drawings, in which, by way of example and not of limitation, two flow sheets for the process according to the invention are given.

Referring to the drawings, in Fig. 1, 1 represents a mixing tank to which a solution of sulphonic acid from the vessel 11 and phenol preparation residue from the bunker 10 are fed continuously, the amount of residue supplied being about ¾ of the amount which would theoretically be required to convert all of the sulphonic acid into potassium sulphonate.

By adding an extra amount of water via the conduit 12, and/or a dilute solution of potassium sulphonate, for which the liquid from the hereinafter described band filter 5, supplied through conduit 16 may be used, the precipitation of potassium sulphonate or calcium sulphonate may be prevented. The feed of the sulphonic acid solution and of the residue is so regulated that the suspension obtained still has an acid reaction. The degree of acidity which is preferred depends on the composition of the residue, the reaction time and temperature.

When the treatment in the mixing tank 1 was carried out at elevated temperature, e. g., at 90° C., it was found that practically all of the potassium from the residue added was dissolved.

The remaining part of the said amount of residue (about ¼) is continuously fed from the bunker 10 into the mixing tank 2, in which it is treated with water supplied through conduit 13 and/or dilute potassium sulphonate solution from the band filter 5, supplied through conduit 16.

The liquids from the tanks 1 and 2 with the solid substances suspended therein are both continuously fed to the mixing tank 4 and mixed therein. In this step an additional amount of potassium sulphonate is formed and a new equilibrium is established between the solution and the solid substances suspended therein.

The suspension from the mixing tank 4 is subsequently fed to the band filter 5, and the solution of potassium sulphonate obtained is conducted to the stirring tank 6 and there subjected to a treatment with a little $K_2CO_3$-solution supplied through conduit 17 so as to compensate the minor potassium losses. Subsequently the solution may be pumped through the conduit 20 to an evaporator (not shown) or, if the concentration of the potassium sulphonate solution is sufficiently high, direct to the mixer (not shown), where the solution is to be mixed with quicklime to obtain a fresh charge of the mixture of potassium sulphonate and lime required for the Tyrer phenol preparation process.

The solid substances which are filtered off in the band filter 5 are washed in counter-current with water supplied through pipe 15, and subsequently discharged at 19. The resulting dilute sulphonate solution may be fed, through conduit 16 into the mixing tank 2 or it may be supplied wholly or partly to the mixing tank 1 and/or the stirring tank 6.

Referring now to Fig. 2 of the drawings like reference numbers have the same meaning as in Fig. 1. This flow sheet is in most respects identical with that represented in Fig. 1, with the exception that from the suspension formed in the mixing tank 1 the solid material is separated by means of the band filter 3 and after washing with water supplied through conduit 14, is removed via 18.

The clear solution obtained is fed into the mixing tank 4; the dilute solution of sulphonate, formed by the washing in counter-current of the precipitate, may be added to the dilute sulphonate solution from the band filter 5 and be supplied, via conduit 16, to the process, for the purposes mentioned hereinbefore.

The dilute sulphonate solution which is obtained from the band filter 5, or the mixture of liquids from the band filters 3 and 5 must not be too concentrated if it is to be fed, wholly or partly, into the mixing tank 2, as otherwise the dissolution of the potassium appears to proceed rather poorly owing to the formation or non-decomposition of double sulphites containing potassium.

As stated hereinbefore, the flow sheets shown in the drawings are intended as examples only. Multifarious alterations may be made without departing from the scope of the invention, e. g., the band filters shown may be replaced by other separators for solids, such as filter drums or centrifuges, and, furthermore the mixing tanks shown may be replaced by helical mixers.

The following example is illustrative of the present invention.

*Example*

Using apparatus as illustrated in the flow sheet shown in Figure 1 of the drawings the preparation of potassium benzene sulphonate was carried out in the manner described hereinafter.

18.1 parts by weight of a technical benzene sulphonic acid solution, containing 93% by weight of said acid, were supplied via the vessel 11 and continuously mixed in the mixing tank 1 with 17.3 parts by weight of the residue of the phenol preparation process according to Tyrer (potassium content 25% by weight), under addition of 15.4 parts by weight of water.

Simultaneously, 4.4 parts by weight of the same residue were continuously treated with 9.1 parts by weight of water in the mixing tank 2.

As far as the working conditions of the band filter 5 permitted, the entire amount of water needed (24.5 parts by weight) was supplied through the pipe 15 as wash water for the band filter 5, so that it was entirely supplied in the form of a dilute potassium benzene sulphonate solution to the mixing tanks 1 and 2 along the conduit 16. In so far as this was not entirely feasible, part of the water was supplied direct along the pipes 12 and 13.

The minor potassium losses could be compensated by supplying a potassium carbonate solution, containing 0.03 part by weight of $K_2CO_3$, to the stirring tank 6 through the conduit 17.

A clear potassium benzene sulphonate solution, with a concentration of 45% by weight of sulphonate could be carried off through the conduit 20.

I claim:

1. A process for preparing a monocyclic aromatic potassium sulphonate which comprises the steps of: (1) treating an aqueous solution of an aromatic sulphonic acid corresponding with the desired sulphonate, with between 70 and 95% of an equivalent amount, based on its potassium content, of the substantially phenol-free residue obtained in the preparation of phenol from a potassium sulphonate and lime; (2) forming a suspension in water of additional residue sufficient to make up the equivalent amount based on potassium content for reaction with the sulphonic acid; (3) mixing together said suspension and the reaction mixture from step (1); and (4) separating suspended solid material from the resulting mixture.

2. A process for preparing a monocyclic aromatic potassium sulphonate which comprises the steps of: (1) treating an aqueous solution of an aromatic sulphonic acid corresponding with the desired sulphonate, with between 70 and 95% of an equivalent amount, based on its potassium content, of the substantially phenol-free residue obtained in the preparation of phenol from a potassium sulphonate and lime; (2) forming a suspension in water of additional residue sufficient to make up the equivalent amount based on potassium content for reaction with the sulphonic acid; (3) mixing together said suspension and the reaction mixture from step (1); (4) separating suspended solid material from the resulting mixture; (5) washing out the separated solid material with water; and (6) utilizing at least part of the dilute potassium sulphonate solution thus obtained in forming said suspension.

3. The process of claim 2 wherein part of the dilute potassium sulphonate solution obtained in the washing treatment is added to the sulphonic acid treating step.

4. The process of claim 1 wherein suspended solid material in the reaction mixture obtained in step (1) is separated prior to admixing the mixture with said suspension.

5. The process of claim 1 wherein said suspension is formed by adding a dilute aqueous solution of potassium sulphonate to said additional residue.

6. The process of claim 2 including the steps of separating suspended solid material in the reaction mixture obtained in step (1) prior to admixing the mixture with said suspension, washing the separated solid material with water, combining the resulting wash solution with the solution obtained in step (5) and utilizing at least part of the thus combined wash solutions in forming said suspension.

7. The process of claim 6 wherein a part of the thus combined wash solutions is used in treating said aqueous solution of sulphonic acid.

8. The process of claim 2 wherein each of said steps is performed continuously.

References Cited in the file of this patent

UNITED STATES PATENTS

| | | |
|---|---|---|
| 1,179,415 | Ellis | Apr. 18, 1916 |
| 1,260,852 | Aylsworth | Mar. 26, 1918 |
| 1,466,991 | Cottringer | Sept. 4, 1923 |
| 1,547,186 | Weiss | July 28, 1925 |
| 2,407,045 | Tyrer | Sept. 3, 1946 |